United States Patent
Witte et al.

(10) Patent No.: US 11,397,972 B2
(45) Date of Patent: Jul. 26, 2022

(54) METHOD FOR ASSESSING DAMAGE TO A MOTOR VEHICLE

(71) Applicant: ControlExpert GmbH, Langenfeld (DE)

(72) Inventors: Andreas Witte, Langenfeld (DE); Nicolas Witte, Langenfeld (DE); Sebastian Schoenen, Langenfeld (DE)

(73) Assignee: ControlExpert GmbH, Langenfeld (DE)

( * ) Notice: Subject to any disclaimer, the term of this patent is extended or adjusted under 35 U.S.C. 154(b) by 0 days.

(21) Appl. No.: 16/870,103

(22) Filed: May 8, 2020

(65) Prior Publication Data

US 2020/0357029 A1    Nov. 12, 2020

(30) Foreign Application Priority Data

May 10, 2019   (DE) .......................... 102019112289.9

(51) Int. Cl.
    *G06Q 30/02*    (2012.01)
    *G01S 19/42*    (2010.01)
    (Continued)

(52) U.S. Cl.
    CPC .......... *G06Q 30/0278* (2013.01); *G01S 19/42* (2013.01); *G06N 3/04* (2013.01);
    (Continued)

(58) Field of Classification Search
    CPC ......... G06Q 30/0278; G06Q 10/06316; G06Q 10/067; G06Q 10/0875; G06Q 10/10;
    (Continued)

(56) References Cited

U.S. PATENT DOCUMENTS 8,035,639 B2   10/2011   Witte
8,510,196 B1    8/2013   Brandmaier et al.
(Continued)

FOREIGN PATENT DOCUMENTS

DE          10 138 264      2/2003
DE       10 2010 020 149   11/2011
(Continued)

OTHER PUBLICATIONS

State intellectual property office of china releases dalian roiland technology's patent application for remote damage assessment method and system based on distributed artificial intelligent image recognition. (Oct. 16, 2017) Global IP News.Transportation Patent News Retrieved from https://dialog.proquest.com/professional/docview/1951522037?accountid=131444 on Mar. 10, 2022 (Year: 2017).*

(Continued)

*Primary Examiner* — Kito R Robinson
(74) *Attorney, Agent, or Firm* — Dority & Manning, P.A.

(57) ABSTRACT

The invention relates to a method for assessing damage to a motor vehicle on the basis of at least one image file of the damaged motor vehicle, the method comprising ascertaining, on the basis of the at least one image file, whether there is damage to the vehicle zone, determining damage severity in the vehicle zones in which damage has been ascertained; establishing a degree of damage for each individual vehicle part within each damaged vehicle zone on the basis of the damage severity in the damaged vehicle zone and deciding, for each damaged vehicle part, whether a repair of the vehicle part may be performed or whether replacement of the vehicle part is required.

15 Claims, 2 Drawing Sheets

Figure 1:
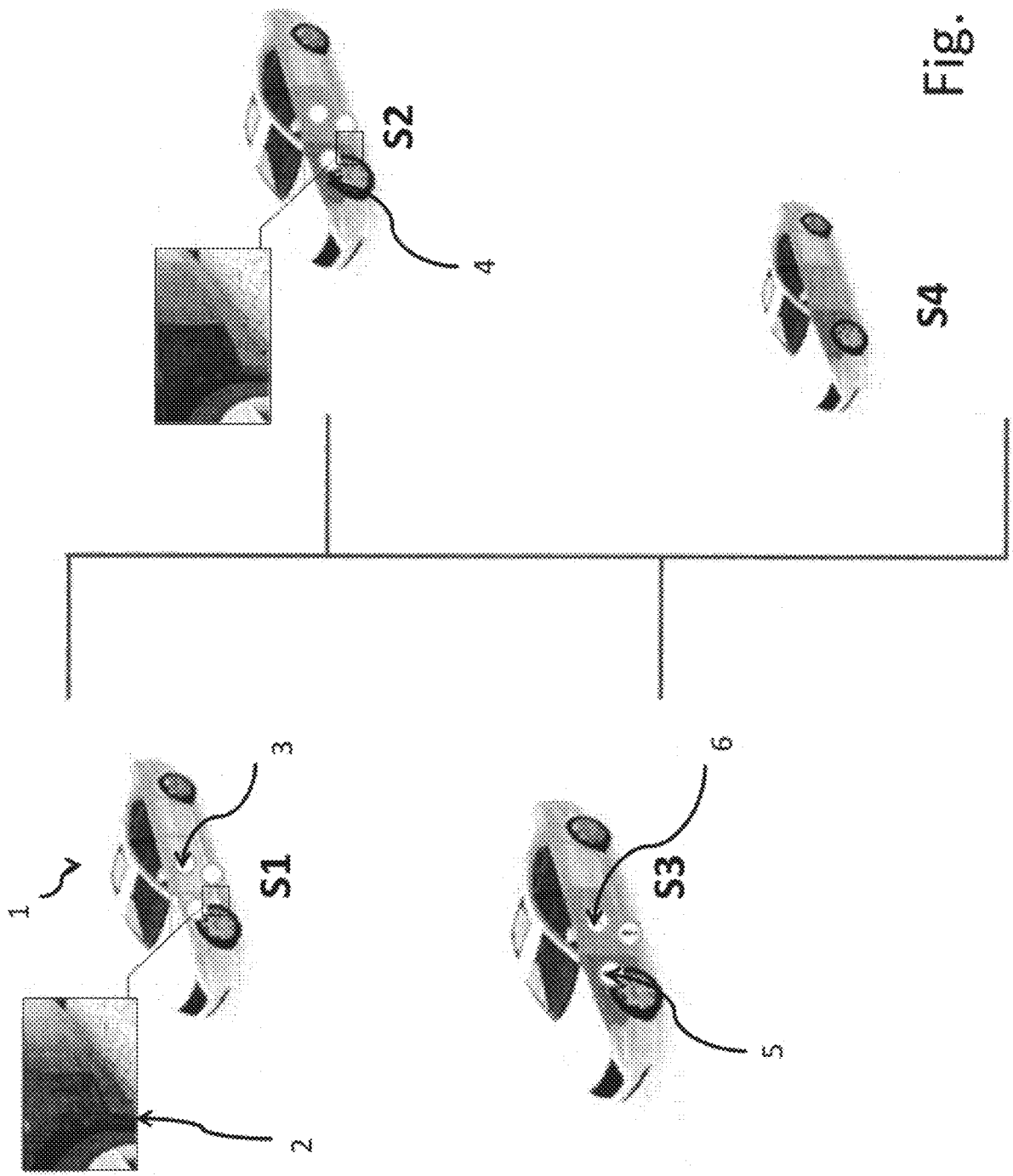

(51) Int. Cl.
| | |
|---|---|
| G06N 3/04 | (2006.01) |
| G06N 3/08 | (2006.01) |
| G06Q 10/06 | (2012.01) |
| G06Q 10/08 | (2012.01) |
| G06Q 10/10 | (2012.01) |
| G06Q 10/00 | (2012.01) |
| G06Q 20/10 | (2012.01) |
| G06Q 40/08 | (2012.01) |
| G06T 7/00 | (2017.01) |
| G06Q 50/26 | (2012.01) |

(52) U.S. Cl.
CPC ............ *G06N 3/08* (2013.01); *G06Q 10/067* (2013.01); *G06Q 10/06316* (2013.01); *G06Q 10/0875* (2013.01); *G06Q 10/10* (2013.01); *G06Q 10/20* (2013.01); *G06Q 20/102* (2013.01); *G06Q 40/08* (2013.01); *G06T 7/0002* (2013.01); *G06Q 50/265* (2013.01); *G06T 2207/20084* (2013.01); *G06T 2207/30252* (2013.01)

(58) Field of Classification Search
CPC ...... G06Q 10/20; G06Q 20/102; G06Q 40/08; G06Q 50/265; G01S 19/42; G06N 3/04; G06N 3/08; G06T 7/0002; G06T 2207/20084; G06T 2207/30252
See application file for complete search history.

(56) References Cited

U.S. PATENT DOCUMENTS

| | | | |
|---|---|---|---|
| 9,886,771 | B1 | 2/2018 | Chen et al. |
| 10,580,074 | B1* | 3/2020 | Fox .................... H04W 4/44 |
| 2002/0067372 | A1 | 6/2002 | Friedrich et al. |
| 2002/0191002 | A1 | 12/2002 | Friedrich et al. |
| 2005/0251427 | A1 | 11/2005 | Dorai et al. |
| 2008/0281658 | A1* | 11/2008 | Siessman ............. G06Q 30/012 705/302 |
| 2009/0234616 | A1* | 9/2009 | Perkins ................. G06Q 10/06 702/184 |
| 2013/0265410 | A1 | 10/2013 | Bolt |
| 2016/0295089 | A1* | 10/2016 | Farahani ............ H04N 5/23216 |
| 2016/0335727 | A1 | 11/2016 | Jimenez |
| 2017/0148102 | A1* | 5/2017 | Franke ............... G06Q 30/0278 |
| 2017/0221110 | A1* | 8/2017 | Sullivan .................... G06K 9/78 |
| 2017/0270489 | A1 | 9/2017 | Dornhausen |
| 2017/0293849 | A1 | 10/2017 | Hodjat et al. |
| 2017/0293894 | A1* | 10/2017 | Taliwal ................ G06K 9/6201 |
| 2018/0293664 | A1 | 10/2018 | Zhang et al. |
| 2018/0293806 | A1 | 10/2018 | Zhang et al. |
| 2018/0350163 | A1* | 12/2018 | Pofale ................ G06Q 30/0283 |
| 2019/0073641 | A1 | 3/2019 | Utke |

FOREIGN PATENT DOCUMENTS

| | | |
|---|---|---|
| DE | 10 2011 013 760 | 9/2012 |
| DE | 21 2010 000 220 | 2/2013 |
| EP | 0 982 673 | 3/2000 |
| EP | 1 640 228 | 3/2006 |
| EP | 3 200 139 | 8/2017 |
| GB | 2554361 | 4/2018 |
| JP | 2003 170 817 | 6/2003 |
| JP | 2008-047037 | 2/2008 |
| WO | WO 2001/0084392 | 11/2001 |
| WO | WO 2005 10 92 63 | 11/2005 |
| WO | WO 2012/113084 | 8/2012 |
| WO | WO 2013/093932 | 6/2013 |
| WO | WO 2018/191435 | 10/2018 |
| WO | WO 2018/191437 | 10/2018 |

OTHER PUBLICATIONS

German Office Action for corresponding DE Application No. 10 2019 112 289.9, dated Jan. 1, 2020—8 pages.
English Translation of Gentian Office Action for corresponding DE Application No. 10 2019 112 289.9, dated Jan. 1, 2020—2 pages.
German Office Action for corresponding DE Application No. 10 2019 112 289.9, dated Jan. 1, 2020, 8 pages (including Google English machine translation).
Scherer, "Neuronale Netze, Grundlagen und Anerndun-gen," "Neural Networks, Fundamentals and Applications," (w/ English summary)—27 pages.
Hoffmann, Kleines Handbuch Neuronale Netze—Anwendungsorientiertes Wissen zum Lernen und Nachschlagen, "Small Handbook of Neural Networks," (w/ English summary)—15 pages.
Girschick, "Fast R-CNN," Microsoft Research, (arXiv: 1504.08083v2 [cs.CV] Sep. 27, 2015)—10 pages.
Redmon et al. "You Only Look Once: Unified, Real-Time Object Detection," (arXiv:1506.02640v5 [cs.CV] May 9, 2016)—10 pages.
Applicant, ControlExpert GmbH, Press Release dated Jun. 1, 2017, "Image recognition with artificial intelligence: key to automation in the automotive claims process" (w/ English translation)—4 pages.
Dietrich, Presentation of the DAT forum damage images from Aug. 3, 2018, Damage patterns, Automated classification, Predictive Business Intelligence (w/ English translation)—57 pages.
Huetter, "CCC to use AI photo estimating to classify total losses from 'a single photo,'" RDN Repairer Driven News, Oct. 16, 2017, https://www.repairerdrivenews.com/2017/10/16/ccc-to-use-ai-photo-estimating-to-classify-total-losses-from-a-single-photo/, retrieved on Mar. 18, 2021—4 pages.
Wiesendahl, "Event log analysis using clustering and pattern recognition," (w/ English summary) Technology Arts Sciences, Oct. 2018—87 pages.

* cited by examiner

METHOD FOR ASSESSING DAMAGE TO A MOTOR VEHICLE

The invention relates to a method for assessing damage to a motor vehicle on the basis of an image file of the damaged motor vehicle.

Traffic accidents occur with increasing frequency as the amount of traffic increases. Following a traffic accident, the first thing necessary is to ascertain how much damage was incurred in the accident, before the resulting claim can be processed with insurance from the party that caused the accident. From a technical standpoint, this means that it must be established which parts of the motor vehicle have been damaged and thus require repair or replacement.

Frequently an automotive expert is appointed to establish the damage from the accident; this expert inspects the vehicle or vehicles in order to be able to estimate the damages from the accident. This automotive expert may draft a report that the insurance company then uses to identify, and thus to quantify, the damages to the vehicle or vehicles involved in the accident, and that the claimant can use to demonstrate what damage his vehicle has incurred.

However, appointing an automotive expert is associated with a great expenditure of time by all of the parties involved, and the time it takes to process the claim with the insurance company can often be several weeks. In addition, it is not uncommon for the insurer of the party at fault in the accident or of the claimant to gather various contradictory expert reports, and this may therefore result in a lengthy legal battle.

Proceeding herefrom, it is the object of the invention to provide a method for assessing damage to a motor vehicle, which method is precise and can be performed rapidly, effectively, and reproducibly.

This object is achieved by the subject matter of claim 1. Preferred embodiments are in the dependent claims.

According to the invention, a method for assessing damage to a motor vehicle on the basis of an image file of the damaged motor vehicle is provided, the method comprising the following steps:

ascertaining, on the basis of the image file, for a plurality of prespecified vehicle zones of the motor vehicle, whether there is damage to the vehicle zone, using a first database, which contains information regarding the vehicle zones of the motor vehicle, and using an artificial neural network, which is trained to detect damage in prespecified vehicle zones of motor vehicles;

determining damage severity in the vehicle zones in which damage has been ascertained, this determination being made on the basis of the image file and using the first database and the artificial neural network;

establishing a degree of damage for each individual vehicle part within each damaged vehicle zone on the basis of the damage severity in the damaged vehicle zone by means of a second database, which specifies vehicle parts present in the vehicle zone and the degree of damage thereof as a function of the damage severity in the vehicle zone;

deciding, for each damaged vehicle part, whether a repair of the vehicle part may be performed or whether replacement of the vehicle part is required, this decision being made on the basis of the degree of damage of the vehicle part and by means of a third database, which includes the result of this decision as a function of the degree of damage to the vehicle part.

By means of the method according to the invention, it is possible to make a precise damage assessment without the costly travel of an automotive expert, thus expending significantly less time. Moreover, the method according to the invention has the advantage that the assessment of the damage to the motor vehicle is not down to the discretion of the expert, but instead the damage is established objectively. When reference is made herein to "damage to the motor vehicle" or "damage due to the accident", this refers to those parts of the motor vehicle that have incurred technical damage due to the accident and the severity with which they have been damaged.

This damage assessment is made possible in particular by defining the vehicle zones, which significantly reduces the complexity of the damage assessment, because a motor vehicle consists of several thousand individual parts. In the method according to the invention, however, it is not directly the damage to each of these individual parts that is established, but instead initially the damage severity in the individual vehicle zones. By means of this damage severity it is then possible to establish the damage to each individual vehicle part. Thus, the method according to the invention is significantly less complex than other possible automated methods in which the damage to the individual vehicle parts would be assessed directly by means of an artificial neural network.

In principle, the damage assessment may be performed for any number of vehicle zones. According to one embodiment of the invention, however, between 20 and 100 vehicle zones are used, particular preferably between 25 and 60, and very particularly preferably between 30 and 50.

According to one specific preferred embodiment of the invention it is also provided that the artificial neural network uses deep learning technology. However, it should be noted that the method according to the invention is not limited to the use of an artificial neural network that uses deep learning technology.

In principle, it is possible, by means of the method, to merely establish the damage to the motor vehicle. According to one preferred embodiment of the invention, however, a method is provided that includes the following additional steps:

determining the replacement parts required for replacing the vehicle parts to be replaced, this determination being made by means of a fourth database, which includes a listing of the replacement parts for each vehicle part and the repair steps associated with repair or replacement of each vehicle part, and preferably also the costs thereof; and determining, by means of the fourth database, the work steps and replacement parts required for repairing or replacing the damaged vehicle parts.

By means of this embodiment, in addition to the establishment of the damage, the required repair steps and replacement parts are also established, possibly along with the associated costs.

According to another preferred embodiment of the invention, it is also provided that the method includes the following additional steps:

establishing, by means of the fourth database, the costs associated with each required replacement part and each required work step; and establishing the total repair costs by adding the established costs for the required work steps and replacement parts.

In addition to the establishment of the required repair steps and replacement parts, by means of this embodiment all of the damage due to the accident is also established, and this may be used to estimate the total repair costs.

In principle, the fourth database may be based on a number of data sources. According to one preferred embodiment of the invention, however, it is provided that the basis for the fourth database is a static model based on historical data. According to an additional or alternatively preferred embodiment of the invention, it is provided that the fourth database, at least in part, is based on a computed model that uses current databases for establishing repair and exchange methods.

In principle, the damage assessment may be performed regardless of the vehicle model of the damaged motor vehicle. According to one preferred embodiment of the invention, however, it is provided that the method for assessing damage includes the following additional steps:
- establishing the vehicle identification number of the motor vehicle;
- determining the vehicle model of the motor vehicle; and
- providing the second database and/or the third database and/or the fourth database in accordance with the vehicle model of the motor vehicle.

According to this embodiment of the invention, the second database, which specifies each vehicle part present in the vehicle zone and its degree of damage as a function of the damage severity to the vehicle zone, the third database, which is designed to make this decision on the basis of a degree of damage of the vehicle part, and the fourth database, which is used to establish necessary replacement parts and repair steps and the costs thereof, are provided in accordance with the damaged vehicle model, which increases the precision of the damage assessment.

In principle, the assessment of the damage to the motor vehicle may be output without further review. According to a preferred embodiment of the invention, however, it is provided that the assessment of the damage to the motor vehicle suggested by the method for damage assessment is output for acceptance or correction by a user, and, following input of acceptance or correction by the user, the artificial neural network uses an accepted or corrected assessment for further learning. This embodiment makes it possible for the user, in particular an automotive expert, to review and, if necessary, correct the suggested damage assessment. The artificial neural network may be further developed by means of this correction, and a contribution may be made to the neural network's learning process so that future damage assessments may be more accurate.

In principle, the image file may originate from any desired source. For example, the image file may be recorded in particular manually or automatically by the motor vehicle following the accident. According to a preferred embodiment of the invention, however, it is provided that image files recorded by a dashcam built into the damaged motor vehicle and/or another motor vehicle involved in the accident are used for the damage assessment, at least in a supporting capacity.

In principle, the assessment of damage to the motor vehicle may be output without any visual representation. According to a preferred embodiment of the invention, however, it is provided that the damaged vehicle zones are displayed on a three-dimensional model of the motor vehicle on a screen by means of an augmented reality kit (ARKit). The function of this embodiment is that the user can visualize the damage and its individual components and thus obtains a clear overview of the damage incurred.

In principle, the assessment of the damage to the motor vehicle may performed using any device and with image files provided by any source. According to a preferred embodiment of the invention, however, it is provided that the method for damage assessment uses an app installed on a smartphone or tablet or can be executed as a web application on a smartphone or tablet, the image files for assessing damage being recorded and/or provided by means of the smartphone or tablet.

According to another preferred embodiment of the invention, it is also provided that the app provides the user with instructions for correctly recording the image files or providing the image files and, if necessary, prompts the user to record or provide additional image files. Providing the method according to the invention using an app has the effect that the method according to the invention is in principle available to every tablet or smartphone user. This has the effect that, if there is an accident, the claimant, if he has a smartphone or tablet with him, can apply the method according to the invention immediately on-site to assess damage from the accident. This has the advantage that the damage claim can be processed much more rapidly and in a much less complicated fashion than if an automotive expert has to be found, and in particular is directly available to a claimant.

According to another preferred embodiment of the invention, it is provided that metadata from the smartphone or tablet, in particular the GPS signal of the smartphone or tablet, are read out by means of the app. According to another preferred embodiment of the invention it is also provided that repair shops and/or towing services in the local area and their contact data are displayed within the app. This embodiment permits the user to obtain an overview of nearby repair shops and towing services so that he can decide immediately where he wants to have the damaged motor vehicle repaired. This has the advantage that the user is spared from tedious searching for repair shops and/or towing services and that the claim thus can be settled in further accelerated fashion.

In principle, the damage to the motor vehicle may be assessed without outputting additional information. According to a preferred embodiment of the invention, however, it is provided that a warning is output if the damage assessment has established that the motor vehicle is no longer roadworthy. This has the important function that it is possible to prevent a car that is no longer roadworthy from being driven in traffic, and also the advantage that no other motorists will be jeopardized by a vehicle that is no longer roadworthy.

In principle, it is possible merely to assess the damage to the motor vehicle without establishing the replacement value of the motor vehicle. According to a preferred embodiment of the invention, however, it is provided that the replacement value of the motor vehicle is established and the repair costs are compared to the replacement value so that the claimant can decide to have either the repair costs or the replacement value paid out directly to himself or to have the motor vehicle taken to a repair shop and repaired there.

This means that the claim can be processed directly, which has the advantage that the claim is processed with minimal effort.

The invention will be explained in greater detail in the following on the basis of a preferred exemplary embodiment, with reference to the drawings.

Figure 2:
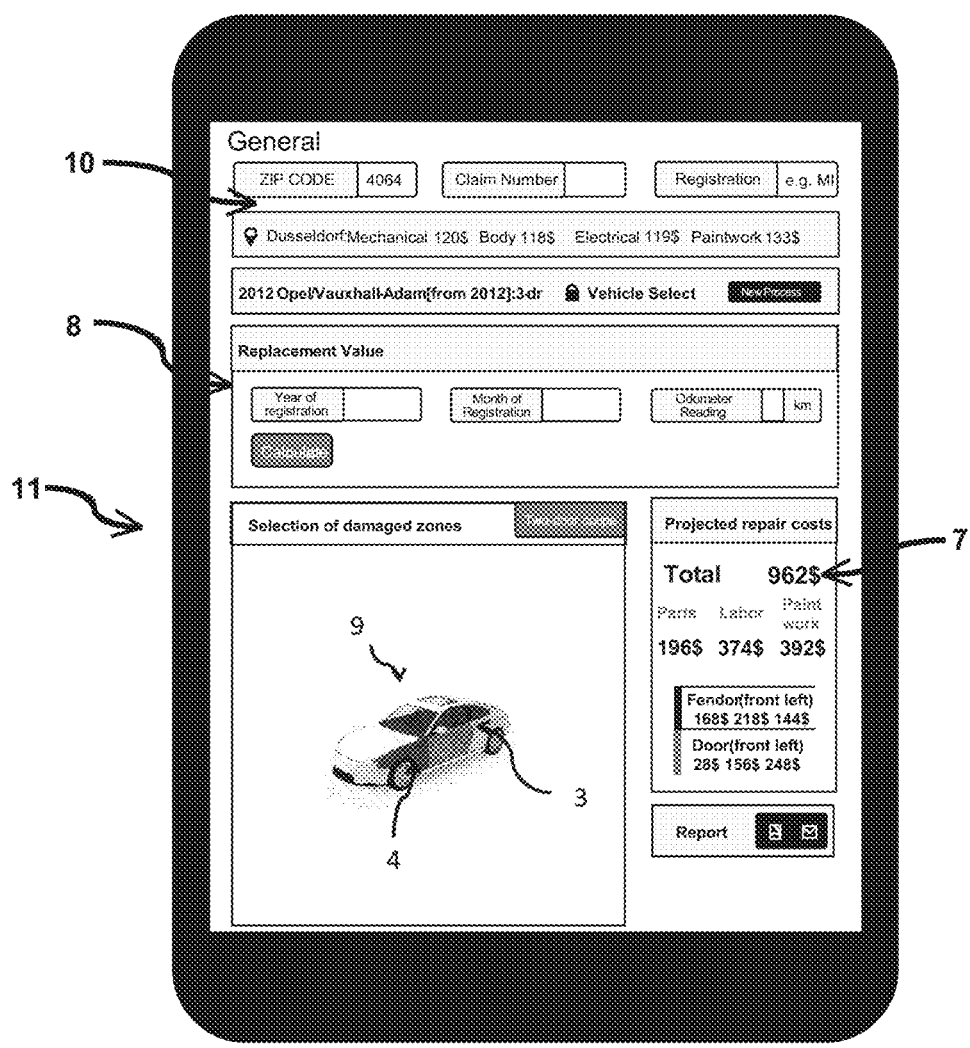

In the drawings:

FIG. 1 shows a schematic depiction of the steps of the method according to the invention for assessing damage to a motor vehicle on the basis of an image file of the damaged motor vehicle according to a preferred exemplary embodiment of the invention; and FIG. 2 shows the output of the damage assessment according to a preferred exemplary embodiment of the invention.

FIG. 1 schematically shows the steps of the method according to the invention for assessing damage to a motor vehicle 1 on the basis of an image file 2 of the damaged motor vehicle 1. Here, in a first method step S1, on the basis of the image file 1, it is ascertained for a plurality of prespecified vehicle zones 3 of the motor vehicle 1 whether there is damage to the various vehicle zones 3. This method step is accomplished using a first database and an artificial neural network that is trained to detect damage in prespecified vehicle zones 3 of motor vehicles 1.

In a second method step, S2, the damage severity 5 is determined for the vehicle zones 3 in which it has been ascertained that there is damage, this determination being made on the basis of the image file 2 and using the first database and the artificial neural network.

The damage severity 5 is determined for each damaged vehicle zone 4 on the basis of the image file 2, and this may be implemented, for example, by outputting a numerical value or by assigning the damage to a predefined category.

In a third method step, S3, a degree of damage is established for each individual vehicle part 6 within each damaged vehicle zone 4 on the basis of the damage severity 5 of the damaged vehicle zone 4, this being accomplished by means of a second database that specifies each vehicle part 6 present in the vehicle zone 3 and the degree of damage thereof as a function of the damage severity 5 of the vehicle zone 3. This degree of damage is established on the basis of the damage severity 5 of the damaged vehicle zone 4 for each vehicle part 6 situated in the damaged vehicle zone 4. For example, if there is damage to a vehicle zone 3 and the damage severity 5 has a very low value, it is probable that there is only damage to the paintwork of the motor vehicle 1. If the damage severity has a very high value, however, it is probable that there is damage to a number of vehicle parts 6, and the degree of damage of the vehicle parts 6 situated on the exterior of the motor vehicle 1 has a very high value.

In a fourth method step, S4, it is decided for each damaged vehicle part 6 whether the vehicle part 6 can be repaired or whether the vehicle part 6 requires replacement, this decision being made on the basis of the degree of damage to the vehicle part 6 and by means of a third database, which is designed to make this decision on the basis of a degree of damage to the vehicle part 6. If the degree of damage to a vehicle part 6 has a low value, it is probable that it will be possible to repair the vehicle part 6. If the degree of damage to a vehicle part 6 has a high value, however, it is probable that it will not be possible to repair the vehicle part 6, and the vehicle part 6 will have to be replaced.

It is thus possible, by means of the method according to the presently described preferred exemplary embodiment of the invention, to determine for each vehicle part 6 of the motor vehicle 1 whether there is damage to the vehicle part 6, and, if there is damage, whether a repair can be performed or whether the vehicle part 6 will have to be replaced.

FIG. 2 illustrates the output of the damage assessment according to a preferred embodiment of the invention. In this case, the damage assessment is output on a tablet 11 and using an app 10, wherein the damaged vehicle zones 3 are displayed on a three-dimensional model of the motor vehicle 9 on a screen 8 by means of an augmented reality kit (ARKit). In addition to the damage assessment for the motor vehicle 1, the work steps and replacement parts required for repairing or replacing the damaged vehicle parts 6 have been determined, and the costs associated with each required replacement part and each required work step and also the total repair costs 7 have been established. In addition, the vehicle model of the motor vehicle 1 has been determined, so that the second database and/or the third database and/or the fourth database have been provided in accordance with the vehicle model of the motor vehicle 1—in this case a three-door 2012 Opel/Vauxhall Adam. The vehicle model can be determined automatically using the vehicle identification number (VIN) for the vehicle, for instance as is described in DE 10 2019 109 941.

If the GPS signal of the smartphone or tablet 11 is read out by means of the app 10, it is also possible to display repair shops and/or towing services in the surrounding area and the contact information thereof. In addition, by manually entering additional data about the motor vehicle 1, it is possible to establish the replacement value of the vehicle, so that the repair costs 7 may be compared to the replacement value, and the claimant has the opportunity either to have the repair costs 7 or the replacement value paid out directly to himself, or to bring the motor vehicle 1 to a repair shop and thus have the claim settled there.

REFERENCE LIST

1 Motor vehicle
2 Image file
3 Vehicle zone
4 Damaged vehicle zone
5 Damage severity
6 Vehicle part
7 Repair costs
8 Screen
9 Three-dimensional model of the motor vehicle
10 App
11 Smartphone or tablet

The invention claimed is:
1. A method for assessing damage to a motor vehicle on the basis of an image file of the damaged motor vehicle, the method comprising the following steps:
  ascertaining, on the basis of the image file, for a plurality of vehicle zones of the motor vehicle, whether there is damage to the vehicle zone, using a first database, which contains information regarding the vehicle zones of the motor vehicle, and using an artificial neural network, which is trained to detect damage in prespecified vehicle zones of motor vehicles;
  determining damage severity in the vehicle zones in which damage has been ascertained, this determination being made on the basis of the image file and using the first database and the artificial neural network;
  establishing a degree of damage for each individual vehicle part within each damaged vehicle zone on the basis of the damage severity in the damaged vehicle zone by means of a second database, which specifies each vehicle part present in each of the plurality of vehicle zones including the damaged vehicle zone and the degree of damage thereof as a function of the damage severity in the damaged vehicle zone;
  deciding, for each damaged vehicle part, whether a repair of the vehicle part may be performed or whether replacement of the vehicle part is required, this decision being made on the basis of the degree of damage of the vehicle part and by means of a third database, which includes the result of this decision as a function of the degree of damage to the vehicle part.

2. The method for assessing damage to a motor vehicle according to claim 1, comprising the following additional steps:
   determining the replacement parts required for replacing the vehicle parts to be replaced, this determination being made by means of a fourth database, which includes a listing of the replacement parts for each vehicle part and the repair steps associated with repairing or replacing each vehicle part; and
   determining, by means of the fourth database, the work steps and replacement parts required for repairing or replacing the damaged vehicle parts.

3. The method according to claim 2, comprising the following additional steps:
   establishing, by means of the fourth database, the costs associated with each required replacement part and each required work step; and
   establishing the total repair costs by adding the established costs for the required work steps and replacement parts.

4. The method for assessing damage to a motor vehicle according to claim 3, wherein the basis for the fourth database is a static model that is based on historical data.

5. The method for assessing damage to a motor vehicle according to claim 3, wherein the fourth database is based on a computed model that uses current databases for establishing repair and exchange methods.

6. The method for assessing damage to a motor vehicle according to claim 1, comprising the following additional steps:
   establishing the vehicle identification number of the motor vehicle;
   determining the vehicle model of the motor vehicle; and
   providing the second database or the third database or the fourth database in accordance with the vehicle model of the motor vehicle.

7. The method for assessing damage to a motor vehicle according to claim 1, wherein the replacement value of the vehicle is established and the repair costs are compared to a replacement value, and the claim can be processed directly by a decision by the claimant to have the repair costs or the replacement value paid out directly to himself or to have the motor vehicle taken to a repair shop.

8. The method for assessing damage to a motor vehicle according to claim 1 having an additional method step in which the assessment of the damage to the motor vehicle suggested by the method for damage assessment is output for acceptance or correction by a user, and, following input of acceptance or correction by the user the artificial neural network uses an accepted or corrected assessment for further learning.

9. The method for assessing damage to a motor vehicle according to claim 1, wherein image files recorded by a dashcam installed in the damaged motor vehicle or another motor vehicle involved in the accident are used for the damage assessment.

10. The method for assessing damage to a motor vehicle according to claim 1, wherein the damaged vehicle zones are displayed on a three-dimensional model of the motor vehicle on a screen by means of an augmented reality kit (ARKit).

11. The method for assessing damage to a motor vehicle according to claim 1 using an application installed on a smartphone or tablet, wherein the image files for damage assessment are recorded or provided by means of the smartphone or tablet.

12. The method for assessing damage to a motor vehicle according to claim 11, wherein the application provides the user with instructions for correctly recording the image files or for correctly providing the image files and, if necessary, prompts the user to record or provide additional image files.

13. The method for assessing damage to a motor vehicle according to claim 11 or 12, wherein metadata from the smartphone or tablet, in particular the GPS signal of the smartphone or tablet, are read out by means of the application.

14. The method for assessing damage to a motor vehicle according to claim 1, wherein repair shops or towing services in the surrounding area and contact data thereof are displayed in the application.

15. The method for assessing damage to a motor vehicle according to claim 1, wherein a warning is output if the damage assessment has established that the motor vehicle is no longer roadworthy.

* * * * *